United States Patent [19]

Kubitza et al.

[11] Patent Number: 4,711,918

[45] Date of Patent: Dec. 8, 1987

[54] USE OF POLYISOCYANATES OR POLYISOCYANATE MIXTURES AS ADDITIVES FOR AQUEOUS EMULSION PAINTS

[75] Inventors: Werner Kubitza; Gerhard Mennicken, both of Leverkusen, Fed. Rep. of Germany

[73] Assignee: Bayer Aktiengesellschaft, Leverkusen, Fed. Rep. of Germany

[21] Appl. No.: 892,220

[22] Filed: Jul. 31, 1986

[30] Foreign Application Priority Data

Aug. 16, 1985 [DE] Fed. Rep. of Germany ....... 3529249

[51] Int. Cl.$^4$ ................................................ C08K 5/29
[52] U.S. Cl. ................................................ 524/196
[58] Field of Search ........................................ 524/196

[56] References Cited

U.S. PATENT DOCUMENTS

| | | | |
|---|---|---|---|
| 3,580,886 | 5/1971 | Stewart et al. | 524/196 |
| 4,186,118 | 1/1980 | Reischl et al. | 260/29.2 |
| 4,327,046 | 4/1982 | Davis et al. | 428/323 |
| 4,388,358 | 6/1983 | Davis et al. | 428/76 |
| 4,605,596 | 8/1986 | Fry | 524/196 |

FOREIGN PATENT DOCUMENTS

| | | | |
|---|---|---|---|
| 3336845 | 4/1985 | Fed. Rep. of Germany | 524/196 |
| 58-149975 | 9/1983 | Japan | 524/196 |

*Primary Examiner*—Joseph L. Schofer
*Assistant Examiner*—N. Sarofim
*Attorney, Agent, or Firm*—Gene Harsh; Joseph C. Gil; Thomas W. Roy

[57] ABSTRACT

The present invention is directed to a process for improving the coatings properties of aqueous emulsion paints having a binder based on homo or copolymers of olefinically unsaturated monomers substantially free from urethane groups by adding at least one organic polyisocyanate having a viscosity at 23° C. of about 50 to 4000 mPa.s, wherein the organic polyisocyanate has aliphatically and/or cycloaliphatically bound isocyanate groups and an isocyanate functionality of at least 3, optionally in combination with other organic polyisocyanates containing aliphatically and/or cycloaliphatically bound isocyanate groups and having an isocyanate functionality of 2, provided that the average functionality is at least 2.2.

The present invention is also directed to the ready for use aqueous emulsion paints prepared by the above process.

8 Claims, No Drawings

USE OF POLYISOCYANATES OR POLYISOCYANATE MIXTURES AS ADDITIVES FOR AQUEOUS EMULSION PAINTS

BACKGROUND OF THE INVENTION

1. Field of the Invention

The present invention is directed to a process for improving the coatings properties of aqueous emulsion paints based on homo or copolymers of olefinically unsaturated monomers by adding organic polyisocyanates containing aliphatically and/or cycloaliphatically bound isocyanate groups.

2. Description of the Prior Art

Emulsion paints owe their widespread use mainly to the fact that they can be diluted with water and the ease with which they can be applied. They are used inter alia as wall paints for both internal and external use on a wide variety of mineral surfaces such as concrete, plaster, rendering, cement, sand limestone, gypsum, etc. Numerous aqueous polymer dispersions are available to the manufacturer as binders for such emulsion paints. These binders usually have a solids content of from 40 to 60% by weight. The polymer binder dispersed in water is generally based on homo or copolymers of olefinically unsaturated monomers such as polyvinyl acetate, polyvinyl propionate, copolymers of styrene/butadiene or styrene/acrylic acid esters, or homopolymers or copolymers of various acrylic acid esters.

These binders are aqueous dispersons of thermoplastic polymers which are made up into emulsion paints ready for use by the addition of conventional auxiliary agents and additives such as pigments, fillers, thickeners, emulsifiers, wetting agents and other additives.

The paints are applied by roller, brush, spray gun, airless spray gun or immersion, but preferably by roller. The coating is dry 10 to 30 minutes after application and hardens within a further 6 to 12 hours to a decorative film with a matte to silky surface finish.

One disadvantage of such coatings is that their use in places such as hospitals and the like is very limited due to their insufficient resistance to chemicals, organic solvents and numerous domestic chemicals with solvent properties such as disinfectants, cleaning agents, etc. The possibility of cleaning the surface with hot steam is also considerably limited by the thermoplastic behavior of these coatings.

The ability to withstand mechanical action such as scrubbing of the surfaces is in many cases insufficient for practical purposes. Lastly, emulsion paints when used for exterior decorating have the disadvantage of soiling very rapidly and in many cases succumbing to rapid chalking with the resulting disintegration of the film.

Various methods have been applied to improve the wear resistance of emulsion paints. It is customary to seal the surfaces with resistant clear lacquer films, e.g. based on polyurethanes. Transparent films based on polymer binders have also been used to increase the surface smoothness and thereby reduce the tendency of the otherwise rough surface to accumulate dirt. These procedures, however, involve additional expenditure of time and material.

It was thereby an object of the present invention to provide emulsion paint systems which may be used for preparing coatings with improved properties, in particular improved resistance to scrubbing, solvents and chemicals, increased weather resistance and reduced swelling without sacrificing the characteristic advantages of emulsion paints, in particular the possibility of diluting them with water, their ease of application and their lack of environmentally harmful characteristics.

It was surprisingly found that this problem could be solved by the use according to the invention of certain organic polyisocyanates which will be described in more detail below.

Although it was already known from DE-OS No. 2,708,442 that the ease of application of aqueous polymer emulsions containing polyurethanes could be improved by the addition of organic diisocyanates if certain criteria are observed in the addition of the diisocyanates, the process disclosed in the said prior publication is strictly limited to dispersions containing polyurethanes and the polyisocyanates to be added must strictly be difunctional diisocyanates. The prior publication therefore gives no suggestion for adding higher functional polyisocyanates to emulsion paints ready for use which are based primarily on homo or copolymers of olefinically unsaturated monomers free from urethane groups in order to improve the lacquer technical properties of the emulsion paints.

SUMMARY OF THE INVENTION

The present invention is directed to a process for improving the coatings properties of aqueous emulsion paints having a binder based on homo or copolymers of olefinically unsaturated monomers substantially free from urethane groups by adding at least one organic polyisocyanate having a viscosity at 23° C. of about 50 to 4000 mPa.s, wherein the organic polyisocyanate has aliphatically and/or cycloaliphatically bound isocyanate groups and an isocyanate functionality of at least 3, optionally in combination with other organic polyisocyanates containing aliphatically and/or cycloaliphatically bound isocyanate groups and having an isocyanate functionality of 2, provided that the average functionality is at least 2.2.

The present invention is also directed to the ready for use aqueous emulsion paints prepared by the above process.

DETAILED DESCRIPTION OF THE INVENTION

The polyisocyanates and polyisocyanate mixtures to be used according to the invention are as defined above, preferably having an average isocyanate functionality of about 2.4 to 3.5 and an isocyanate group content of about 15 to 25% by weight, and a viscosity of 23° C. of about 50 to 3000 mPa.s. The isocyanate groups may be aliphatically and/or cycloaliphatically bound, but are preferably exclusively aliphatically bound.

Preferred "lacquer polyisocyanates" which satisfy these conditions are based on hexamethylene diisocyanate and/or 1-isocyanato-3,3,5-trimethyl-5-isocyanatomethyl-cyclohexane (IPDI), while most especially preferred are those based on hexamethylene diisocyanate alone. By "lacquer polyisocyanates" based on these diisocyanates is meant the known derivatives of these diisocyanates which contain biuret, urethane, uretdione and/or isocyanurate groups and which after their preparation have been treated in known manner, preferably by distillation, to reduce the amount of excess starting diisocyanate down to a residue of at the most 0.7% by weight, preferably less than 0.5% by weight. Included among the particularly preferred polyisocyanates used according to the invention are the biuret group-containing polyisocyanates based on hexamethylene diisocyanate conforming to the above criteria may be obtained by the processes according to U.S. Pat. Nos. 3,124,605, 3,358,010, 3,903,126, 3,903,127 or 3,976,622 and contain mixtures of N,N',N''-tris-(6-isocyanatohexyl)-biuret with minor quantities of its higher homologues; the trimers of hexamethylene diisocyanate conforming to the above criteria, obtainable according to U.S. Pat. No. 4,324,879 and containing substantially N,N',N''-tris-(6-isocyanatohexyl)-isocyanurate mixed with minor quantities of its higher homologues; and especially mixtures, conforming to the above criteria, of polyisocyanates based on hexamethylene diisocyanate and containing uretdione and isocyanurate groups, such as may be obtained by the catalytic trimerization of hexamethylene diisocyanate with the addition of trialkyl phosphenes. The lastmentioned mixtures are particularly preferred if they have a viscosity at 23° C. of about 50 to 500 mPa.s and an isocyanate functionality of about 2.2 to 3. Lacquer polyisocyanates which are not based on hexamethylene diisocyanate alone, but also on IPDI, are only suitable if they fulfill the above-mentioned criteria of viscosity. However, the derivatives of IPDI are frequently solid products which are not suitable for the purpose of the invention. The lacquer polyisocyanates based on hexamethylene diisocyanate exemplified above are therefore preferred.

The lacquer polyisocyanates to be used according to the invention are preferably in solvent-free form. Their viscosity at room temperature (23° C.) should therefore be as low as possible so that they may easily be incorporated in the emulsion paint. The most preferred viscosity range for the polyisocyanates is about 50 to 500 mPa.s/23° C.

The emulsion paints which are to be modified according to the invention are conventional emulsion paints based on homo or copolymers of olefinically unsaturated monomers, i.e. they may be based on polyvinyl acetate; copolymers of vinyl acetate with vinyl chloride and ethylene; homo and copolymers of acrylic acid esters and/or methacrylic acid esters, e.g. the methyl, ethyl, propyl and/or butyl esters of these acids; copolymers of these esters with styrene and optionally butadiene; and styrene/butadiene copolymers.

The emulsion paints suitable for use according to the invention are generally in the form ready for use, i.e. the use according to the invention generally takes place shortly before application of the emulsion paints. The paints therefore generally already contain the usual auxiliary agents and additives used in lacquer technology, e.g. emulsifying and dispersing agents, wetting agents, preservatives, thickeners, pigments, fillers and optionally minor quantities of organic solvents which are often present due to the use of solvent-containing additives of the type mentioned above in the preparation of the emulsion paints.

For the use according to the invention, the polyisocyanate is added to the emulsion paint by simple stirring, generally in a quantity of about 2 to 20% by weight, preferably about 5 to 10% by weight based on the dispersion paint to be modified. The dispersion paints generally have a binder content of about 40 to 60% by weight, not including the weight of the auxiliary agents and additives. The polyisocyanate may be added by simple stirring without any special precautions. After addition of the polyisocyanate, the emulsion paints generally only have a limited working life and should therefore be applied in known manner within a period of about 1 to 2 hours. The emulsion paints according to the invention are suitable for all the known fields of application of aqueous emulsion paints, for example for coating mineral building surfaces such as rendering bound with lime and/or cement, surfaces containing gypsum, wood fiber/cement building materials, concrete, wood and wood products such as chipboard or fiberboard, metal surfaces, road surfaces containing asphalt and various plastics surfaces.

The invention is further illustrated, but is not intended to be limited by the following examples in which all parts and percentages are by weight unless otherwise specified.

EXAMPLES

The emulsion paints used in the following examples have the following composition:
26 parts by weight of polymer dispersion, 50% in water
50 parts by weight of pigments and fillers
10 parts by weight auxiliary agents (wetting agents, defoaming agents, inhibitors, stabilizers and the like)
about 14 parts by weight of water.

The following polyisocyanates were used in the examples:

POLYISOCYANATE A

A lacquer polyisocyanate based on hexamethylene diisocyanate, containing isocyanurate and uretdione groups and having an average isocyanate functionality of about 2.5, prepared by the catalytic dimerization and trimerization of hexamethylene diisocyanate using tributyl phosphene as catalyst. The polyisocyanate mixture had a viscosity at 23° C. of 150 mPa.s and an isocyanate content of 22% by weight. The free hexamethylene diisocyanate content was below 0.5%.

POLYISOCYANATE B

A biuret polyisocyanate based on hexamethylene diisocyanate having a viscosity at 23° C. of 2500 mPa.s, an isocyanate functionality of about 3.2, an isocyanate content of 23% by weight and a free hexamethylene diisocyanate content of below 0.5% by weight.

POLYISOCYANATE C

A polyisocyanate based on hexamethylene diisocyanate, containing isocyanurate groups, having an isocyanate functionality of about 3.2, an isocyanate content of 21.5% by weight, a viscosity at 23° C. of about 2000 mPa.s and a free hexamethylene diisocyanate content below 0.5% by weight.

EXAMPLE 1

A white pigmented emulsion paint having the above composition ready for use in which the binder is composed of butyl acrylate/styrene copolymer (ERCUSOL AS 250 of Bayer AG) was mixed at room temperature with 8% by weight, based on the emulsion paint, of solvent-free polyisocyanate A. Incorporation of the polyisocyanate in the emulsion paint ready for use produced a 2-component paint system with a working life of about 2 hours and a drying time to produce a nonmarring surface of about 25 minutes. The hardened film obtained was distinguished by the following properties when compared with the film obtained from the unmodified paint: (see also "assessment criteria").

|                                                              | Unmodified paint film | Paint film modified with polyisocyanate A |
| ------------------------------------------------------------ | --------------------- | ----------------------------------------- |
| Surface solubility                                           | 15                    | 8                                         |
| Solvent wiping test with mineral spirits double strokes      | 3                     | 11                                        |
| abrasion resistance double strokes                           | 150–220               | 500–600                                   |

EXAMPLE 2

A white pigmented emulsion paint having the above composition ready for use in which the binder content according to the manufacturers specification (Mowilith DM 772 of Hoechst AG) was based on a copolymer of acrylic acid esters was mixed with 5% by weight, based on the emulsion paint, of polyisocyanate A. When the mixture had been homogenized, it formed a coating system having a working life of about 2 hours and a drying time to produce a nonmarring surface of about 20 minutes. The hardened film was distinguished by the following properties when compared with the film obtained from the unmodified paint:

|                                                         | Unmodified paint film      | Paint film modified with polyisocyanate A |
| ------------------------------------------------------- | -------------------------- | ----------------------------------------- |
| Surface solubility                                      | 16                         | 9                                         |
| Solvent wiping test with mineral spirits double strokes | 4                          | 9                                         |
| abrasion resistance double strokes                      | 360                        | 1085                                      |
| adherence to moist concrete (DIN/ISO 4627)              | 1.2 MPa                    | 2.9 MPa                                   |
| water absorption coefficient (DIN 52617)                | $10^{-2}$ kg/m$^2$ × h$^{0.5}$ | $10^{-3}$ kg/m$^2$ × h$^{0.5}$       |
| Abrasion value, Taber Abrader, CS 10/1 kg/1000 U        | 230 mg                     | 176 mg                                    |

EXAMPLE 3

A white pigmented emulsion paint ready for use having the above composition in which the binder content according to the manufacturers specifications (Mowilith DM 122 of Hoechst AG) was based on a copolymer of vinyl acetate, vinyl chloride and ethylene was mixed with 10% by weight, based on the emulsion paint, of polyisocyanate A. The working life of the mixture was 2 hours and the paint dried to a nonmarring surface within 40 minutes. The hardened film was distinguished by the following properties when compared with the film obtained from the unmodified paint:

|                                                         | Unmodified paint film          | Paint film modified with polyisocyanate A |
| ------------------------------------------------------- | ------------------------------ | ----------------------------------------- |
| Surface solubility                                      | 19                             | 9                                         |
| Solvent wiping test with mineral spirits double strokes | 5                              | 17                                        |
| abrasion resistance double strokes                      | 220                            | 2100                                      |
| adherence to moist concrete (DIN/ISO 4627)              | 0.7 MPa                        | 1.9 MPa                                   |
| water absorption coefficient (DIN/52617)                | $7 \times 10^{-2}$ kg/m$^2$h$^{0.5}$ | $6 \times 10^{-3}$ kg/m$^2$h$^{0.5}$ |

EXAMPLE 4

A white pigmented emulsion paint ready for use having the above composition in which the binder content was based on a butyl acrylate/styrene copolymer (Ercusol AS 250 of Bayer AG) was mixed with 8% by weight, based on the emulsion paint, of polyisocyanate B. The working life of the resulting mixture was about 1 hour and the drying time to produce a nonmarring state was 20 to 25 minutes. The film from the modified paint was distinguished from that obtained with the unmodified paint by its substantially improved solvent resistance.

|                    | Unmodified paint film | Paint film modified with polyisocyanate B |
| ------------------ | --------------------- | ----------------------------------------- |
| Surface solubility | 12                    | 4                                         |

EXAMPLE 5

A white pigmented emulsion paint having the composition indicated above in which the binder content was based on a styrene/butadiene copolymer (LITEX SB 40 of Chemische Werke Hüouls AG) was mixed with 13% by weight, based on the emulsion paint, of solvent free polyisocyanate A. Homogeneous mixing of the two components resulted in a mixture having a working life of one hour. The drying time to produce a nonmarring state was about 20 minutes. The hardened film was distinguished from that of the unmodified paint by the following characteristics:

|                                                         | Unmodified paint film | Paint film modified with polyisocyanate A |
| ------------------------------------------------------- | --------------------- | ----------------------------------------- |
| Surface solubility                                      | 17                    | 6                                         |
| Solvent wiping test with mineral spirits double strokes | 5                     | 9                                         |
| Abrasion resistance double strokes                      | 115                   | 1142                                      |
| adherence to moist concrete (DIN/ISO 4627)              | 1.2 MPa               | 2.9 MPa                                   |

EXAMPLE 6

A white pigmented emulsion paint ready for use and described in Example 1 was mixed with 8% by weight, based on the emulsion paint, of solvent free polyisocyanate C. The coating system obtained by mixing the previously prepared paint with the polyisocyanate had a working life of 4 hours. The drying time to produce a nonmarring state was 20 minutes. The hardened film was distinguished from that obtained with unmodified paint by the following characteristics:

|  | Unmodified paint film | Paint film modified with polyisocyanate A |
| --- | --- | --- |
| Surface solubility | 15 | 9 |
| solvent wiping test with mineral spirits double strokes | 3 | 8 |

ASSESSMENT CRITERIA

Surface solubility 5 wads of cotton wool each impregnated with one of the 5 following organic solvents: mineral spirits, toluene, ethylglycol acetate, acetone or ethanol, were placed on the surface of the film for 1 minute. After removal of the wads, the film surface was briefly dabbed with filter paper and then tested manually within 10 to 15 seconds (fingernail test) for swelling. The results were assessed according to the following scheme:

0 = Film is unchanged.
1 = Film has undergone a trace of swelling (the surface cannot be torn by scratching, but shows a barely visible ring of swelling due to the effect of solvent).
2 = Film is slightly swollen (the surface of the film can be slightly torn by scratching).
3 = Film shows moderate swelling (ring of swelling is clearly visible, surface can be torn).
4 = Film shows severe swelling (substance of film can be scratched right down to the base).
5 = Film shows very severe swelling (substance of film is partly or completely soluble in the given solvent and the surface remains sticky for a considerable time).

The total of the individual assessments was taken, amounting to 0 in the most favorable case and 25 in the least favorable.

Solvent wiping test

A rag of black linen was soaked in mineral spirits and wiped repeatedly over the surface of the hardened film with a light pressure until the first signs of slight chalking appeared. The number of double strokes was counted.

Abrasion resistance

This test was based on DIN 73778, but the following changes were found to be necessary for better differentiation:

Instead of using a scrubbing brush, wet sand paper, grain 220, was placed on the surface.

The weight applied by the scrubbing box was increased by 0.5 kg to a total of 1.0 kg.

The washing liquid used was distilled water.

The number of double strokes performed until the first signs of paint rubbing through to the black surface underneath was counted.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for improving the coatings properties of an aqueous emulsion paint having a binder comprising a homo or copolymer of olefinically unsaturated monomers substantially free from urethane groups which comprises adding to said aqueous emulsion paint an organic polyisocyanate component having aliphatically and/or cycloaliphatically bound isocyanate groups, a viscosity at 23° C. of about 50 to 4000 mPa.s and an average isocyanate functionality of at least 2.2, wherein said organic polyisocyanate component comprises at least a portion of an organic polyisocyanate having an isocyanate functionality of at least 3.

2. The process of claim 1 wherein said organic polyisocyanate component is added solvent-free to said homo or copolymers.

3. The process of claim 1 wherein said organic polyisocyanate component has an average isocyanate functionality of about 2.4 to 3.5, an isocyanate content of about 15 to 25% by weight and a viscosity at 23° C. of about 50 to 3000 mPa.s.

4. The process of claim 2 wherein said organic polyisocyanate component has an average isocyanate functionality of about 2.4 to 3.5, an isocyanate content of about 15 to 25% by weight and a viscosity at 23° C. of about 50 to 3000 mPa.s.

5. A process for improving the coatings properties of an aqueous emulsion paint having a binder comprising a homo or copolymer of olefinically unsaturated monomers substantially free from urethane groups which comprises adding to said aqueous emulsion paint, without adding a formaldehyde-based condensation resin, an organic polyisocyanate component having aliphatically and/or cycloaliphatically bound isocyanate groups, a viscosity at 23° C. of about 50 to 4000 mPa.s and an average isocyanate functionality of at least 2.2, wherein said organic polyisocyanate component comprises at least a portion of an organic polyisocyanate having an isocyanate functionality of at least 3.

6. The process of claim 5 wherein said organic polyisocyanate component has an average isocyanate functionality of about 2.4 to 3.5, an isocyanate content of about 15 to 25% by weight and a viscosity at 23° C. of about 50 to 3000 mPa.s.

7. A ready for use aqueous emulsion paint consisting essentially of
(i) a binder comprising a homo or copolymer of olefinically unsaturated monomers substantially free from urethane groups and
(ii) at least one organic polyisocyanate component having aliphatically and/or cycloaliphatically bound isocyanate groups, a viscosity at 23° C. of about 50 to 4000 mPa.s and an average isocyanate functionality of at least 2.2, wherein said organic polyisocyanate component comprises at least a portion of an organic polyisocyanate having an isocyanate functionality of at least 3.

8. The aqueous emulsion paint of claim 7 wherein said organic polyisocyanate component has an average isocyanate functionality of about 2.4 to 3.5, an isocyanate content of about 15 to 25% by weight and a viscosity at 23° C. of about 50 to 3000 mPa.s.

* * * * *